(12) United States Patent
Zidd et al.

(10) Patent No.: US 9,146,681 B1
(45) Date of Patent: Sep. 29, 2015

(54) SYSTEM AND METHOD OF READING DATA FROM A NON-VOLATILE STORAGE MEDIUM THROUGH THE USE OF A CATALOG

(71) Applicant: THOMSON LICENSING, Issy de Moulineaux (FR)

(72) Inventors: George Zidd, Burbank, CA (US); Vince Cerundolo, Pasadena, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 14/201,334

(22) Filed: Mar. 7, 2014

(51) Int. Cl.
*G11B 5/02* (2006.01)
*G06F 3/06* (2006.01)

(52) U.S. Cl.
CPC ............ *G06F 3/0611* (2013.01); *G06F 3/0608* (2013.01); *G06F 3/0643* (2013.01); *G06F 3/0686* (2013.01)

(58) Field of Classification Search
None
See application file for complete search history.

(56) References Cited

U.S. PATENT DOCUMENTS

| 5,455,409 | A | * | 10/1995 | Smith et al. ................... 235/385 |
| 6,084,736 | A | * | 7/2000 | Kurokawa et al. ............... 360/71 |
| 6,710,962 | B1 | * | 3/2004 | Caverly et al. .................. 360/69 |
| 6,778,346 | B2 | * | 8/2004 | Takayama et al. ............... 360/69 |

* cited by examiner

*Primary Examiner* — K. Wong
(74) *Attorney, Agent, or Firm* — Robert D. Shedd; Vincent E. Duffy; Palak Bhakta

(57) ABSTRACT

A process for obtaining information from an LTO storage device using a catalog such as the catalog is disclosed. At the outset, a user requests to access one or more files from the LTO storage device. The user then accesses a catalog constructed in the manner discussed above that indicates the location of the desired files on the LTO storage device. From there, the user commands an appropriately configured LTO robot to seek out the desired files located on the LTO storage device. Upon receiving the commands, the LTO robot locates the desired file by reading the entire tape, decodes the desired files and delivers them to the user.

15 Claims, 4 Drawing Sheets

SYSTEM AND METHOD OF READING DATA FROM A NON-VOLATILE STORAGE MEDIUM THROUGH THE USE OF A CATALOG

REFERENCE TO RELATED APPLICATIONS

This application is also related to the application entitled "SYSTEM AND METHOD OF WRITING TO A NON-VOLATILE STORAGE MEDIUM" which has been filed concurrently and is incorporated by reference herein in its entirety.

FIELD OF INVENTION

The following disclosure relates to information storage mediums, and more particularly to methods of writing and reading at least one file to and from a non-volatile storage medium utilizing magnetic tape data storage technology that also builds a catalog of the data written to the tape, allowing for ready access in the future.

BACKGROUND

Today, many industries employ Linear Tape Open ("LTO") storage technology. This technology is suited to house backups/archives of various types of data due to its high storage to physical size ratio, its lack of volatility, and its ability to maintain the integrity of the stored data without a constant supply of power. Motion picture and television industries commonly use LTO to capture and store high-definition video. Such industries commonly employ LTO storage device management robots ("robots") that are capable of quickly loading and mounting the desire LTO storage device. If there is already an LTO storage device in the robot's desired read-slot, then the robot must unmount and remove the LTO storage device.

However, as the name suggests, LTO storage media are linear, in that the data stored thereon is stored sequentially, bit-by-bit, on a large strip of magnetic tape. Thus, in order to access data on an LTO storage device, the device must be in a robot's "import/export tray," an area that allows the LTO storage device to be physically read by a "read-head," which exists inside the robot an is capable of scanning data stored on the magnetic tape. As a consequence, this tape must be fast-forwarded or rewound to a particular location on the tape in order to load a particular file. Further, in order to access one file on a particular LTO storage device, the entire contents of the device must be written to a traditional spinning hard drive.

With each generation of LTO storage devices having increased storage capacity, the feasibility of writing the entire contents of an LTO storage device has decreased proportionally. One method of alleviating this problem is to incorporate "file markers" into the LTO storage device. Such file markers placed physical barriers comprising bits of "null code" on the magnetic tape that are identifiable by an appropriately configured computer, thereby separating user-defined directories. Such file markers allow an LTO storage device to be directly "fast forwarded" to a specific directory.

Unfortunately, file markers fail to fully serve the needs of the industry. User-defined directories often contain hundreds of files, each containing a multitude of frames any of which may be desired by an editor. These directories, despite being a fraction of the size of the entire LTO storage device, are often still too large to be used conveniently, and inserting increasingly numerous file markers wastes space on an LTO storage device. In addition, increasing the number of file markers on a storage device increasingly slows the process of reading data from an LTO storage device.

SUMMARY

In view of the foregoing background, it is desirable to be able to readily access any portion of the LTO storage device. In at least the motion picture and television industries, this ability has significant consequences by greatly reducing the loading and rendering time of various frames and files. One specific benefit of this ability is to enable a video editor to create a final "cut" without wasting time waiting for the relevant files to load. Pursuant to this aforementioned desire, an editor might desire to use files spread across multiple LTO storage devices.

A process for obtaining information from an LTO storage device using a catalog such as the catalog is disclosed. At the outset, a user requests to access one or more files from the LTO storage device. The user then accesses a catalog constructed in the manner discussed above that indicates the location of the desired files on the LTO storage device. From there, the user commands an appropriately configured LTO robot to seek out the desired files located on the LTO storage device. Upon receiving the commands, the LTO robot locates the desired file by reading the entire tape, decodes the desired files and delivers them to the user.

BRIEF DESCRIPTION OF THE DRAWINGS

For a more complete understanding of the present disclosure, reference is made to the following detailed description of an embodiment considered in conjunction with the accompanying drawings, in which.

DETAILED DESCRIPTION

The following disclosure is presented to provide an illustration of the general principles of the present disclosure and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning.

Further, it should be noted that, as recited in the specification and in the claims appended herein, the singular forms 'a,' "an," and "the" include the plural referents unless otherwise stated. Additionally, the terms "comprises" and "comprising"

when used herein specify that certain features are present in that embodiment, however, this phrase should not be interpreted to preclude the presence or additional of additional steps, operations, features, components, and/or groups thereof.

The embodiments disclosed herein can be performed on any UNIX-based computer or a different computer running a virtualization of such a UNIX-based computer. Additionally, the embodiments can also be executed on a UNIX-based server, which then provides the end-result of the embodiment to the user.

In certain embodiments a command line interface is used to invoke or otherwise carry out the methodologies set forth herein. The use of command line controls allows the methodologies and processes set forth herein to be invoked by more conveniently by other programs. This allows other software to be developed that can make calls to or otherwise invoke the methodologies and processes set forth herein.

Most embodiments are stored on computer-readable storage media, such as disk drives, compact disks (CDs), digital video disks (DVDs), or across a transmission medium, such as the Internet.

Figure 1:
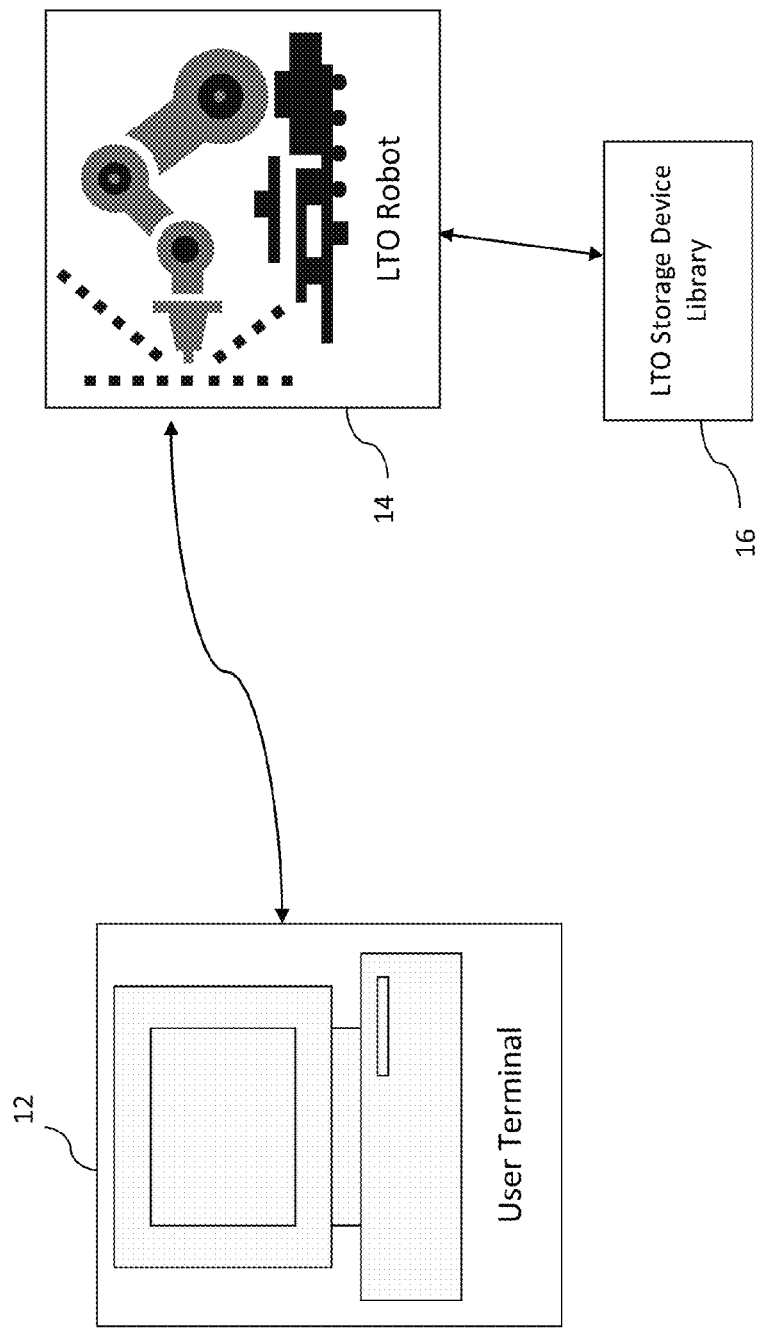
FIG. 1 is a diagram illustrating an LTO system for interacting with an LTO robot and one or more LTO storage devices in accordance with an embodiment of the present disclosure.

FIG. 1 illustrates an LTO system 10 that includes a user terminal 12 that is configured to interact with an LTO robot 14 to perform read and write processes in connection with LTO storage devices (not shown). The LTO robot 14 is configured to interact with an LTO storage device library 16 to search for and obtain select LTO storage devices for use in reading content stored thereon. The user terminal 12 utilizes a user interface ("UI") to generate catalogues (not shown) associated with one or more LTO storage devices such that each catalogue identifies where the LTO robot can find and retrieve specific portions of content desired by the user of the user terminal 12. The LTO system 10 is configured to perform a number of functions, which are discussed in greater detail below.

Figure 2:
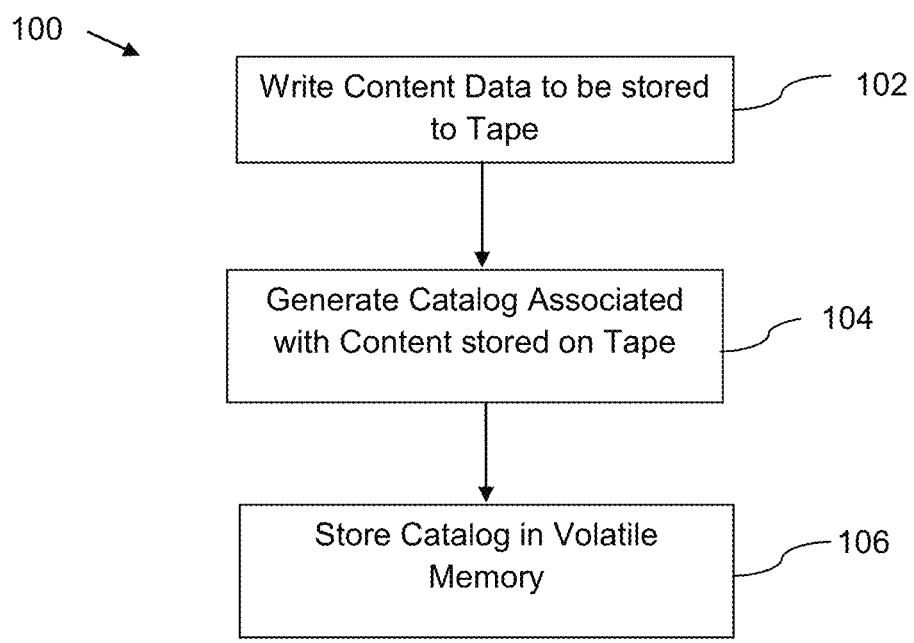
FIG. 2 is a flow chart illustrating a process of writing digital data to an LTO storage device while creating a catalog of the data being written in accordance with an embodiment of the present disclosure.

FIG. 2 illustrates a write process 100 for cataloguing information to an LTO storage device. The write process 100 begins by writing content data the user wishes to store to an LTO storage device (step 102). In one embodiment, such content data is written such that each portion of the content data is associated with a file. Once the LTO storage device has stored the content data, a user creates a catalog (step 104) identifying particular locations on the LTO storage device associated with particular files of the content data the user wishes to recall in the future. The catalog is then stored on a separate memory for later use (step 106).

For each file, the catalog includes information regarding the identity and location of the file to allow a user to access the content data associated with the file quickly. Such information can include, but is not limited to, a barcode indicating which LTO storage device should be searched, information regarding particular file markers associated with the file, a file identifier, a block count associated with the file, a range indicator indicating the file's size, and an explicit name of the file. The catalog comprises pure text stored in any basic text format (e.g. a .txt file) and can be generated through the use of storage format-specific commands, such as TAR commands. By recording this information in a pure text file, the catalog allows an appropriately configured computer to quickly access the desired file on an LTO storage device. Keeping the size of the catalog small also allows for it to be stored in traditional computer storage media, either remotely or locally.

In one embodiment, the write process 100 begins with the command line instruction or command "natty," which has parameters for the directory that contains the desired file or files, the name of the content (i.e., "show name") to which the desired files pertain, and an identifier code, such as a barcode or a matrix code, identifying the particular LTO storage device where the desired files are to be written. An example of the execution of this "natty" command is as follows:

"natty [directory]-show [showname]-S -i -ow- bc[barcode]-x -np"

where -show[showname] is used to specify the name of the content; -S is used to allow spaces in the archive; -i is used to set type to "internal;" -ow is used to force overwrite old logs; -bc [barcode] is used to specify the barcode of the desired LTO storage device; -x is used to not prompt for the editing log; and -np is used to not print the log. After these parameters have been specified, all of the selected files are written to the LTO storage device. This process iterates until all of the desired files have been encoded.

The write process 100 described herein writes a directory of files to an LTO storage device using industry-standard, non-proprietary formats such as TAR. The process simultaneously aggregates information related to the location of the files in a catalog. After completing the write operation, the process subsequently stores the catalog. In the embodiments, the 'tar' and 'mt' commands baked into UNIX/LINUX systems are utilized.

Figure 3:
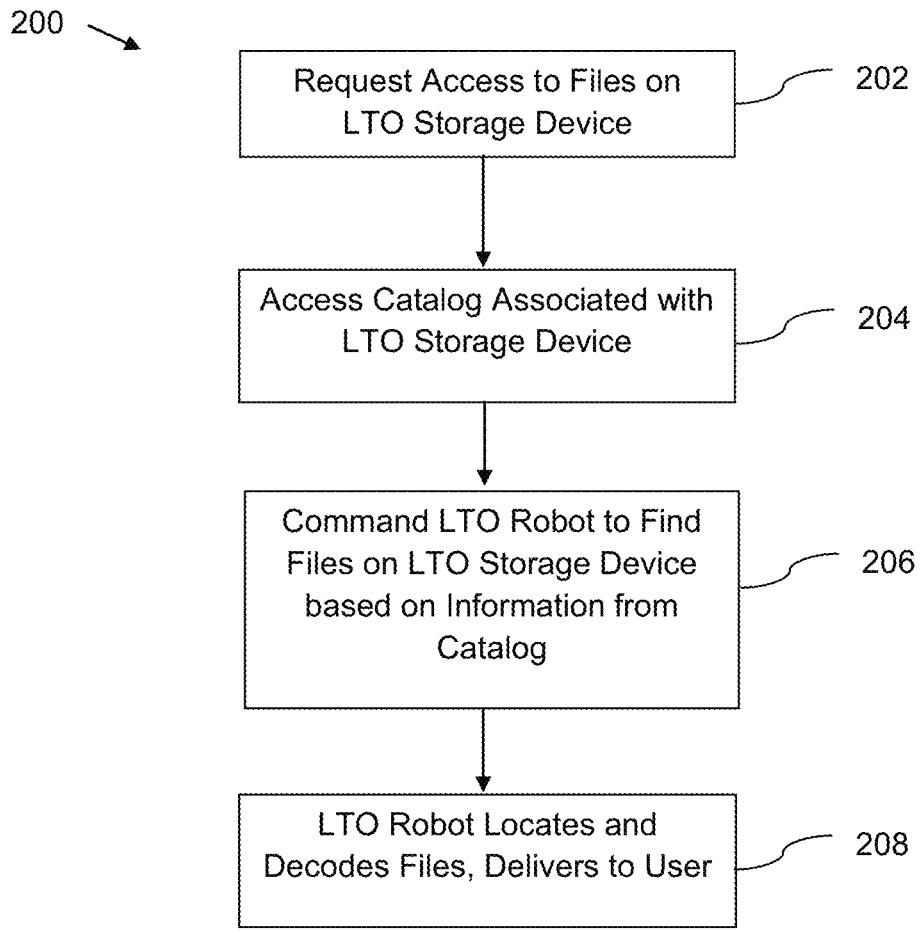
FIG. 3 is a flow chart illustrating a process of reading digital data from an LTO storage device through the use of a catalog in accordance with an embodiment of the present disclosure.

FIG. 3 illustrates a read process 200 for obtaining information from an LTO storage device using a catalog such as the catalog discussed above. At the outset, a user requests to access one or more files from the LTO storage device (step 202). The user then accesses a catalog (step 204) constructed in the manner discussed above that indicates the location of the desired files on the LTO storage device. This can be initiated with the command "teread" having parameters for a particular file or a particular LTO storage device that contains at least one desired file. From there, the user commands an appropriately configured LTO robot to seek out the desired files located on the LTO storage device (step 206). Upon receiving the commands, the LTO robot locates the desired file by reading the entire tape, decodes the desired files and delivers them to the user (step 208). In one embodiment, the LTO robot locates the desired files by fast-forwarding through the LTO storage device directly to select ranges on the tape that contain the desired information.

Figure 4:
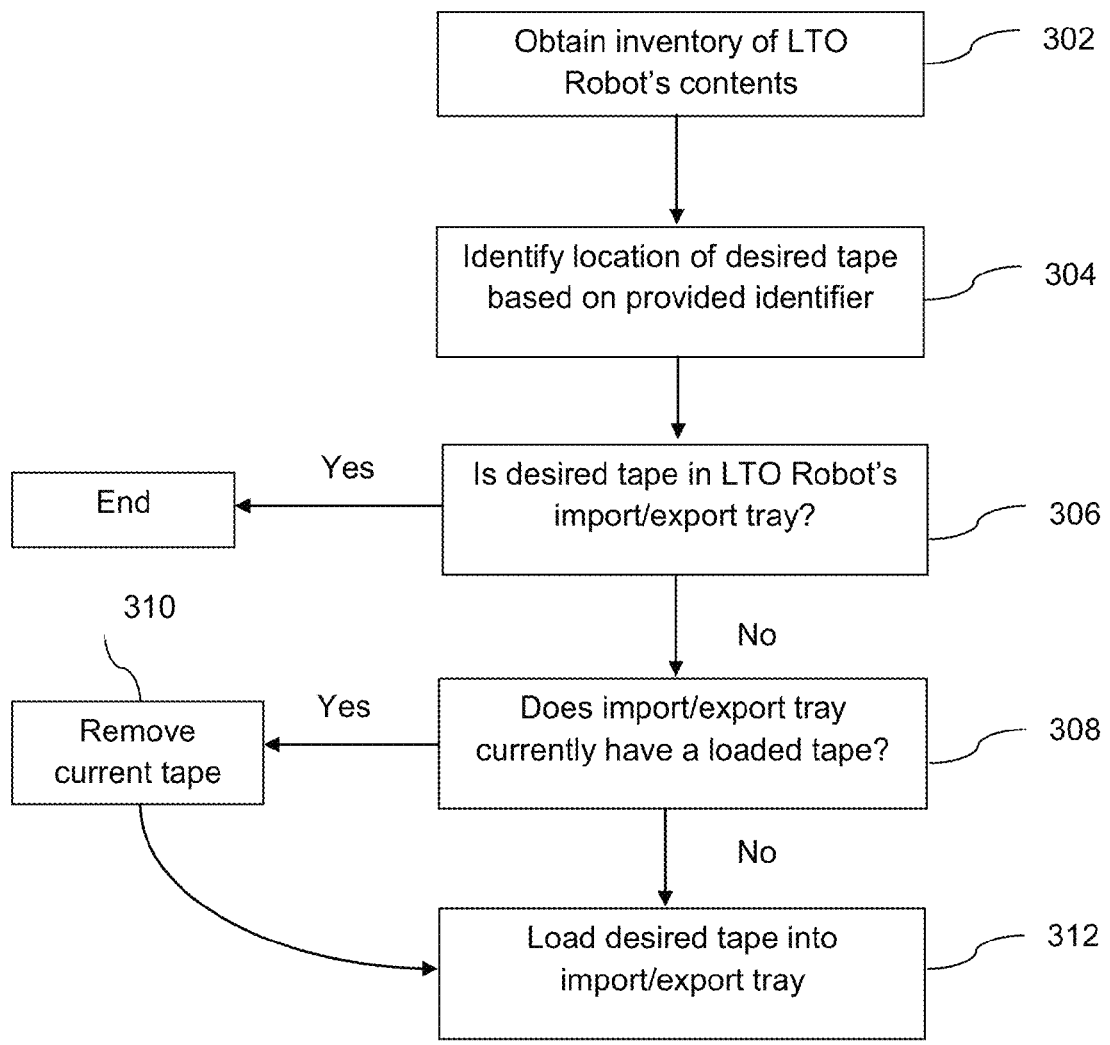
FIG. 4 is a flow chart illustrating a process of loading an LTO storage device into an LTO robot in accordance with an embodiment of the present disclosure.

FIG. 4 illustrates a method of operating an LTO robot to manipulate an LTO storage device to accomplish the methods shown in FIGS. 2 and 3. At the outset, a user instructs a robot to obtain an inventory of the robot's contents (302). The LTO robot's contents can include one or more tapes including stored content. The LTO robot next identifies the location of the desired tape based on an identifier provided by the user (step 304). Such an identifier can include, but is not limited to, a barcode or a matrix code. If the desired tape is currently in the import/export tray of the LTO robot, then the process ends (step 306). If not, the LTO robot then checks whether it currently has a tape loaded in the import/export tray (step 308), and if so, removes the currently loaded tape (step 310). The LTO robot can then load the desired tape and transfer it into the import/export tray of the LTO robot (step 312). This process can be repeated as necessary if the desired content data is distributed across multiple LTO storage devices.

In one embodiment, the command line instruction or command "robot" is utilized. The "robot" command is capable of executing, at least the command line instructions or commands -t| -tr| -tx| -r| -s| -S| -ns| -d| -z| -i| -l| -e| -E| -L| -U| -ll| -ul| -LL| -ul| -LL| -UL| -x| -T, wherein -t lists the tape devices, slot#'s, and coordinates; -tr lists the tape devices attached to the robot; -tx lists the tape devices not attached to the robot; -r lists the robot device; -s shows the status of the robot; -S shows the raw output of "mtx" a UNIX/LINUX terminal command; -ns tells the embodiment not to output the status in between each command; -d # outputs the tape device of a given slot# or barcode; -z # outputs the slot# of a given tape device or barcode; -i # imports slot #s or barcode#s (# can be replaced with "all" to select all); -l interactively selects drives to import; -e # exports slot#s or barcode#s (# can be replaced with "all" to select all); -E interactively selects drives to export; -L interactively loads tapes; -LL interactively loads LTFS tapes; -U interactively unloads tapes; -UL interactively unloads LTFS tapes; -l # loads slot# or barcode# to any available drive; -l # # loads slot# or barcode# to a named drive; -l; # loads LTFS slot# or barcode# to any available drive; -;l # # loads LTFS slot# or barcode# to a named drive; -u # unloads slot# or barcode# to any available slot; -u # # unloads slot# or barcode# to a named slot; -ul; # unloads LTFS slot# or barcode# to any available slot; -ul # # unloads LTFS slot# or barcode# to a named slot; -x # # transfers the tape in slot# to a second slot#; -T gets the status of whether the robot will work with the computer executing the embodiment. These commands may be utilized by the user in any logical order to achieve the desired result.

An example of a workflow according to a particular embodiment is described below:

1. Get an inventory of robot by running the "sudo mtx -f [directory containing robot]" command while referencing the appropriate directory.
2. Load the robot with an LTO storage device via the "robot -l [storage slot]" command.
3. Unload an LTO storage device from the robot via the "robot -u [storage slot]" command.
4. Transfer the LTO storage device into the import/export tray with the "robot -i [storage slot]" command.
5. Transfer the LTO storage device out of the import/export tray with the "robot -e [storage slot] command.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications without departing from the scope of the disclosure. All such variations and modifications are intended to be included within the scope of the disclosure as defined in the appended claims.

We claim:

1. A method of reading content from a storage tape through the use of a catalog, comprising:
    requesting access to a storage tape including one or more files;
    accessing a catalog associated with the one or more files, the catalog including information indicating where on the storage tape each of the one or more files is located; and
    accessing the one or more files located on the storage tape corresponding to the information in the catalog, wherein the requesting and accessing are performed in response to one or more command line instructions.

2. The method of claim 1, wherein the storage tape is incorporated in a linear tape open storage device.

3. The method of claim 2, wherein the accessing the one or more files is performed by a linear tape open robot.

4. The method of claim 3, wherein the accessing the one or more files includes reading the storage tape entirely, fast-forwarding to one or more select ranges of tape located on the storage tape, and decoding the one or more select ranges of tape.

5. The method of claim 1, wherein the catalog includes information selected from the group consisting of a barcode indicating a storage tape to be searched, information regarding file markers associated with the one or more files, a file identifier, a block count, and a range indicator indicating a file's size.

6. A computer apparatus for reading content from a storage tape through the use of a catalog, comprising:
    a memory; and
    a processor configured, in response to one or more command line instructions, to:
        request access to a storage tape including one or more files;
        access a catalog associated with the one or more files, the catalog including information indicating where on the storage tape each of the one or more files is located; and
        access the one or more files located on the storage tape corresponding to the information in the catalog.

7. The computer apparatus of claim 6, wherein the storage tape is incorporated in a linear tape open storage device.

8. The computer apparatus of claim 7, wherein the accessing the one or more files is performed by a linear tape open robot.

9. The computer apparatus of claim 8, wherein the accessing the one or more files includes reading the storage tape entirely, fast-forwarding to one or more select ranges of tape located on the storage tape, and decoding the one or more select ranges of tape.

10. The computer apparatus of claim 6, wherein the catalog includes information selected from the group consisting of a barcode indicating a storage tape to be searched, information regarding file markers associated with the one or more files, a file identifier, a block count, and a range indicator indicating a file's size.

11. A non-transitory computer-readable medium having instructions thereon for causing a processor to perform, in response to one or more command line instructions, the following:
    request access to a storage tape including one or more files;

access a catalog associated with the one or more files, the catalog including information indicating where on the storage tape each of the one or more files is located; and access the one or more files located on the storage tape corresponding to the information in the catalog.

12. The medium of claim 11, wherein the storage tape is incorporated in a linear tape open storage device.

13. The medium of claim 12, wherein the accessing the one or more files is performed by a linear tape open robot.

14. The medium of claim 13, wherein the accessing the one or more files includes reading the storage tape entirely, fast-forwarding to one or more select ranges of tape located on the storage tape, and decoding the one or more select ranges of tape.

15. The medium of claim 11, wherein the catalog includes information selected from the group consisting of a barcode indicating a storage tape to be searched, information regarding file markers associated with the one or more files, a file identifier, a block count, and a range indicator indicating a file's size.

* * * * *